United States Patent [19]
Koslowski et al.

[11] Patent Number: 5,665,290
[45] Date of Patent: Sep. 9, 1997

[54] PROCESS FOR MANUFACTURING BRICK MOULDINGS

[75] Inventors: Thomas Koslowski; Thomas Fandel, both of Aachen, Germany

[73] Assignee: SICOWA Verfahrenstechnik fur Baustoffe GmbH & Co. KG, Aachen, Germany

[21] Appl. No.: 272,517

[22] Filed: Jul. 11, 1994

Related U.S. Application Data

[63] Continuation of Ser. No. 982,649, Dec. 1, 1992, abandoned.

[30] Foreign Application Priority Data

Dec. 2, 1991 [DE] Germany .................. 41 39 642.1

[51] Int. Cl.$^6$ .................................................... C04B 33/32
[52] U.S. Cl. ..................... 264/669; 264/680; 501/155
[58] Field of Search ....................... 264/56, DIG. 49, 264/63; 501/155

[56] References Cited

U.S. PATENT DOCUMENTS 1,967,311  7/1934  Kern .
2,576,565  11/1951  Brown ................................. 501/155

FOREIGN PATENT DOCUMENTS

| | | | |
|---|---|---|---|
| 570799 | 2/1959 | Canada ................................. | 501/155 |
| 087474 | 7/1983 | European Pat. Off. . | |
| 0376690 | 4/1990 | European Pat. Off. . | |
| 158028 | 12/1982 | German Dem. Rep. ............... | 501/155 |
| 222292 | 5/1985 | German Dem. Rep. ............... | 501/155 |
| 8706326 | 6/1987 | Germany . | |
| 3183669 | 8/1991 | Japan . | |
| 658109 | 4/1979 | U.S.S.R. ............................... | 501/155 |
| 881065 | 11/1981 | U.S.S.R. ............................... | 501/155 |
| 1186685 | 4/1970 | United Kingdom . | |

*Primary Examiner*—James Derrington
*Attorney, Agent, or Firm*—Cushman Darby & Cushman, IP Group of Pillsbury Madison & Sutro LLP

[57] ABSTRACT

The invention relates to a process for manufacturing brickworks mouldings by mixing a compound containing a granular clay-containing material with a lean material and, if required, other additives from which moulding compound green products are moulded, dried and burnt. This process permits a recycling of residual materials by using as clay-containing material a residual material consisting predominantly of clay minerals, especially a dry fraction, predominantly composed of annealed clay minerals, of an ash, preferably brown coal ash, and by producing the moulding compound by mixing the fraction with the lean material and other additives as well as water, where water is used in such a quantity as to produce an earth-moist moulding compound which is then pressed in portions on a press to form individual, inherently stable green products.

14 Claims, 2 Drawing Sheets

PROCESS FOR MANUFACTURING BRICK MOULDINGS

This is a continuation of application Ser. No. 07/982,649, filed on Dec. 1, 1992 now abandoned.

BACKGROUND OF THE INVENTION FIELD OF THE INVENTION

This invention relates to a process for manufacturing brickworks mouldings by mixing a moulding compound consisting of a granular clay-containing material with a lean material and, if required, other additives from which moulding compound individual, inherently stable green bricktype products are moulded by compression moulding, which are then dried and fired.

DESCRIPTION OF THE RELATED ART

Normally, brick mouldings are manufactured by processing earth-moist clay-containing material from natural resources with a lean material and, if required, other additives as well as water to form an extrudable compound. The strand emerging from the extrusion press is then divided into individual green bricks which are stacked, dried and finally burnt fired. The plasticity of the mineral originating from the earth deposits is utilised here. However, this does not conserve natural resources. Upon drying and firing, a drying and firing shrinkage occurs which must be taken into consideration in the manufacture of the green bricks. In addition, it is difficult to obtain sharp, uncracked edges with good dimensional stability.

On the other hand, brown coal ashes, for example, which include a proportion consisting of clay minerals occur to a considerable extent in the conversion of brown coal to generate electricity. Although these clay minerals have the advantage that they are annealed as a result of the combustion of the brown coal, they lack the necessary plasticity for extrusion, quite apart from the fact that they occur mixed with other residual materials. Brown coal ashes of this kind are currently for the most part dumped as waste and the residual materials contained therein are not utilised.

A process is known from EP-A-0,087,474 for manufacturing brick mouldings by mixing a moulding compound consisting of a granular clay-containing material with a lean material and, if required, other additives, from which moulding compound individual, inherently stable green bricks are formed by compression moulding and which are dried and fired. In this process, a clay is thus made lean with coal ash, it being possible to add relatively large quantities of ash only to a very high-quality, extremely plastic clay such as, for example, kaolin or montmorillonite since it is absolutely necessary to obtain a plastic green compound which is to be processed to form mouldings by injection moulding, extrusion or compression moulding, so that the ash is used as the lean material. Accordingly, if compression moulding is used, the moulding pressures are low and a quantity of water is chosen to obtain the necessary consistency. High pressures cannot be used with a plastic raw mixture, since otherwise water and, depending on the moulding pressure, also granular material is forced out and, in addition, the raw mixture tends to stick to the mould and can then no longer be flawlessly taken from the mould.

SUMMARY OF THE INVENTION

An object of the invention is to provide a process of the type described at the outset which permits residual materials to be used in order, on the one hand, to reduce dumping problems, and on the other hand, to conserve natural raw materials.

This object is achieved in that, as clay-containing material, a residual material consisting predominantly of clay minerals, especially a dry fraction, consisting predominantly of annealed clay minerals, of an ash, preferably brown coal ash, is processed with water, the lean material and the other additives, if required, to form an earth-moist moulding compound which is pressed at pressures on the order on magnitude of 15 to 20 $N/mm^2$ to form the green bricktype products.

Here, the residual material is not used as lean material, but as actual clay substitute; that is to say, the bricktype product is manufactured without clay and especially also without high-quality clay from natural resources, and is, manufactured from residual material as clay-containing material.

Other embodiments of the appended invention can be taken from the following description and the appended claims.

The invention is described below in connection with the accompanying drawings.

DETAILED DESCRIPTION OF THE PRESENTLY PREFERRED EXEMPLARY EMBODIMENTS

Figure 1:
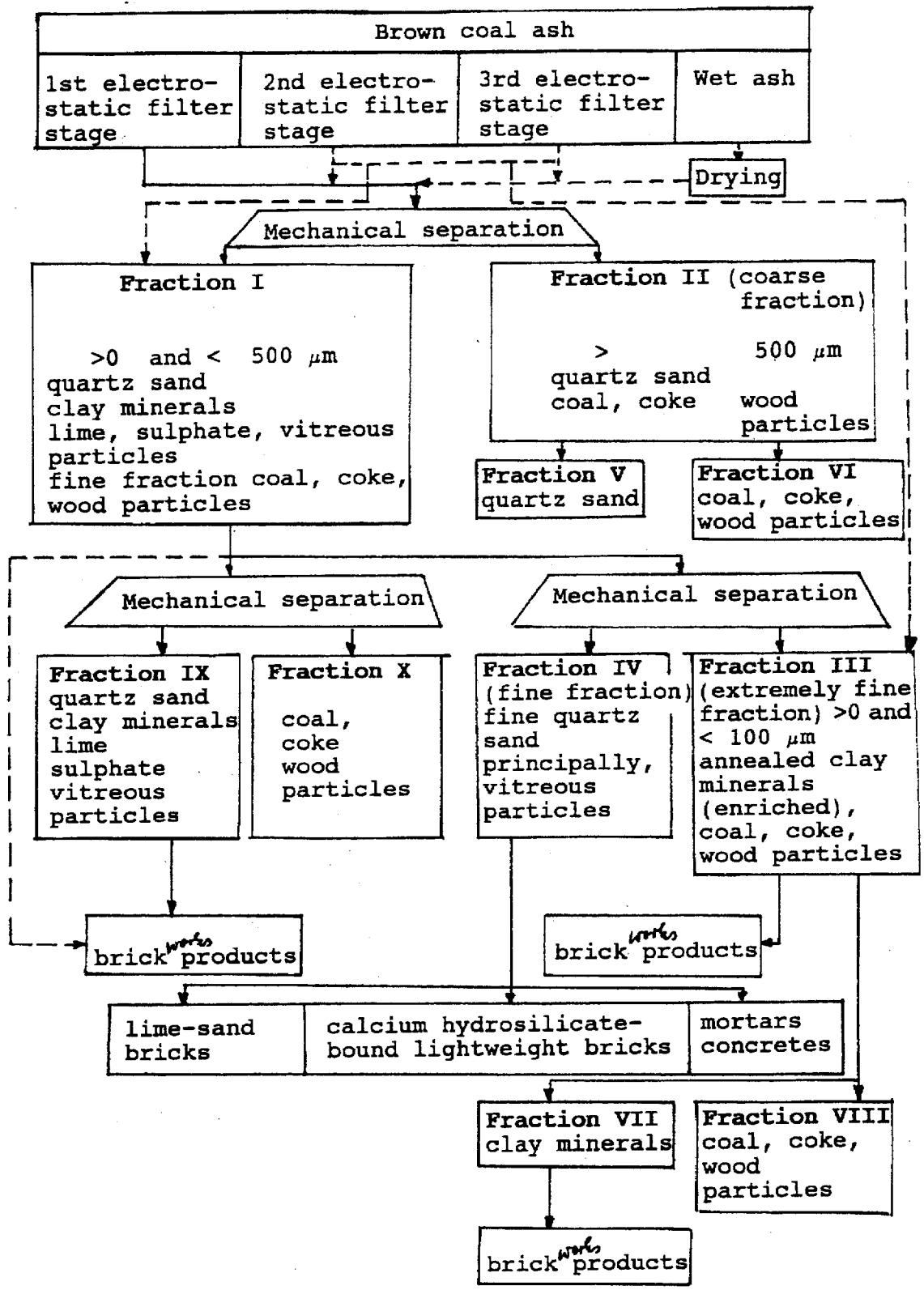
FIG. 1 shows a flow diagram for the processing of brown coal ash.

For the most part, brown coal ash occurs generally as dry electrostatic filter ash and in a low proportion as wet ash. Electrostatic filter ash from the first electrostatic filter stage (approximately 90% by weight of the electrostatic filter ash) also contains predominantly coarse-grained ash components, whilst the electrostatic filter ash from a second and, in some circumstances, a third electrostatic filter stage is in the form of very fine particulate matter.

Electrostatic filter ash contains quartz sand and, annealed clay minerals which together generally make up approximately 70 to 90% of the ash by weight as well as lime-containing, sulphate, other aluminate and ferrite components as well as and vitreous particles together with coal, coke and wood particles.

The fine and extremely fine components, with a grain size upper limit of approximately <500 µm, preferably approximately <300 µm, especially approximately <200–250 µm, are separated in a first stage as fraction I mechanically from a fraction II with particles of a correspondingly larger grain size. The fraction II particles can contain predominantly coarser quartz sand and coarser coal, coke and wood particles, especially screened and contain as a result of the separation in the range up to the specified grain size predominantly fine quartz sand and clay mineral as well as other aluminate, ferrite, lime-containing, sulphate and vitreous components, as well as a fine fraction of coal, coke and wood particles. In particular, only the brown coal fly ash from a first electrostatic filter stage is subjected to the separation and the fraction I thus separated, if required together with the fly ash occurring in further electrostatic filter stages which in general substantially consists predominantly of clay-mineral components, is processed.

The fraction I is subjected to a further mechanical separation which depends on the recycling planned for the fractions then obtained.

In general, a further mechanical separation takes place, for example, by screening into a fraction III (extremely fine fraction) with a grain size upper limit of approximately <100 μm, especially approximately <40–70 μm and a fraction IV (fine fraction) with a grain size lower limit of approximately >100 μm, especially approximately >40–70 μm. The fraction III contains principally annealed clay minerals as well as small quantities of extremely fine proportions of coal, coke and wood particles, which can be separated if required to obtain a fraction VII consisting virtually entirely of annealed clay minerals and a fraction VIII of combustible residual materials, and can therefore be used as such or in the form of fraction VII for bricktype products.

If required, the electrostatic filter ash from the second and any further electrostatic filter stages can be mixed with fraction III and further processed with this, since these principally contain extremely finely particulate annealed clay minerals.

The fraction IV, which principally contains corresponding quartz sand and a small proportion of the other substances, principally V, trears particle from fraction I but is substantially free of clay minerals and is suitable, for example, for use in the production of calcium hydrosilicate-bound construction materials such as lime-sand bricks, lightweight lime-sand bricks, aerated concrete blocks or the like, or as fine sand for mortar, plasters, concretes and the like, but also as foundry casting sand.

Of the remaining fraction II, the combustible material is separated off especially by classification, preferably air classification; however, other separating processes, which expediently exploit the large difference in specific weight between coal, coke and wood particles and the other components of fraction II, can be used. The fraction V thus obtained consists substantially of fine quartz sand, which can make up to approximately 75% by weight of the brown coal fly ash. The other occurring fraction VI consists of combustible material and can be fed back into the combustion cycle.

However The separation of the fraction I can also be carried out, for example, by classification in such a manner that essentially the coal, coke and wood particles are removed as, for example, a burnable fraction X and a fraction IX remains, which consists essentially of quartz sand and clay minerals. The fraction IX can also be used for bricktype products such as bricks and tiles.

The fractions I and IX are especially suitable for manufacturing brickworks products; however the fractions III and VII are not excluded.

Figure 2:
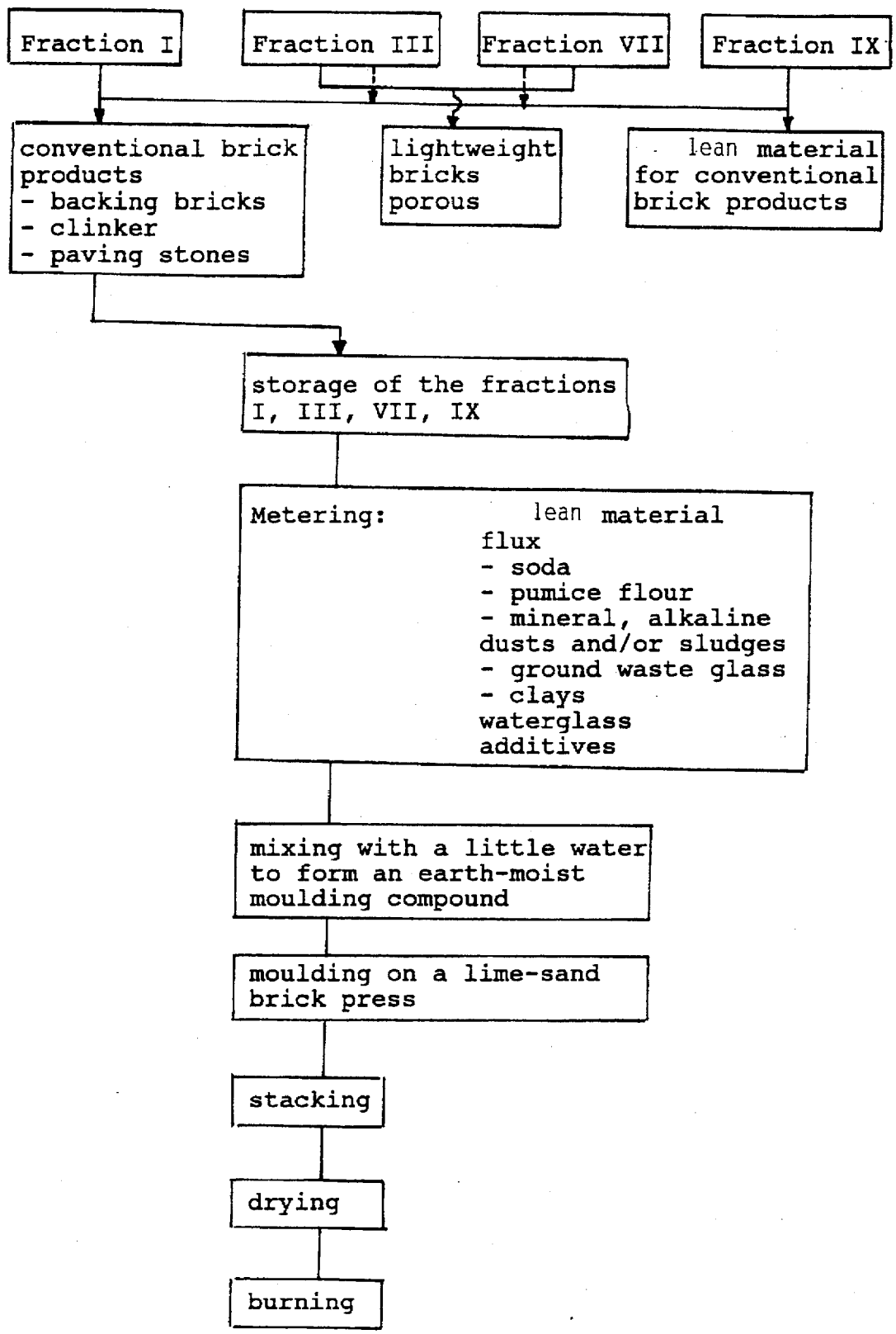
FIG. 2 shows a flow diagram for the recycling of certain fractions from the flow diagram of FIG. 1.

Green bricks for brickworks products such as backing bricks, clinker, paving stones and the like are manufactured according to FIG. 2 after metering and mixing the fractions used with opening material and other additives for producing an earth-moist raw mixture and pressing it.

Suitable lean materials include sands, such as quartz sand from other fractions of the brown coal ash, slags or the like.

It is expedient to add flux (whose alkali content necessitates a lower required burning temperature), approximately 1 to 2% by weight of soda, up to 10% by weight of pumice flour, and if required up to approximately 10% by weight of clays, but also especially highly alkaline mineral dusts and/or sludges (e.g., red mud from aluminium extraction, grinding muds) up to approximately 10% by weight and especially also up to approximately 10% by weight of ground waste glass. The fluxing agents can also be used in the mixture.

Water is added in such a manner as to produce a moisture content of approximately 5 to 7% by weight moisture, that is to say, an earth-moist raw mixture, which is then pressed in portions on a press such as a lime-sand brick press, that is to say with compressive forces or the order of magnitude of 15 to 20 N/mm$^2$ and above, to form inherently stable green brickworks products. The green products are then fired. Here, bricks can be provided as solid bricks or cavity bricks with a corresponding hole pattern such as lime-sand bricks.

Before burning, the green bricks are usually dried. In this process, pozzuolanic components of the brown coal ash, which in the earth-moist environment react with the lime also present in small quantities, contribute to the pressed green product retaining its inherent stability provided by the pressing process and not disintegrating during drying. In the case of insufficient amounts of the corresponding pozzuolanic substances in the residual material, an inorganic adhesive such as waterglass can be added, for example in a quantity of 1 to 2% by weight, if necessary; however, no adhesive acting agent is necessary in general.

In particular, there is the additional possibility here of recycling waste glass, which can be used in a correspondingly ground state.

Because of the lack of plasticity of the annealed clay minerals of the brown coal fly ash with brickworks products of this kind, relative to that of products manufactured from unannealed clays, advantageously only a very low shrinkage occurs, that is to say firing and drying shrinkage are very low, and sharp edges and a good dimensional stability result. A pozzuolanic reaction of corresponding ash components in the presence of the mixing water contributes to the stability of the green products under load and to the formation of sharp edges.

After drying, the wet ash can be subjected to the intended mechanical separations together with the fly ash.

Suitable clay-containing material includes not only brown coal ash or a dry fraction thereof, but any residual material consisting predominantly of clay minerals which can be made into brickworks products, especially a dry fraction, consisting predominantly of annealed clay minerals, of an ash.

We claim:

1. A method for manufacturing bricktype mouldings comprising the steps of:

preparing a moulding compound from a mixture consisting essentially of an enriched annealed clay minerals material, containing pozzuolanic components and lime, derived as a fraction from ash, with particle sizes less than about 300 μm, a filler material and water to provide about 5 to 7% by weight moisture so that the moulding compound has an earthy moisture content;

moulding said moulding compound to produce individual, inherently stable green products by compression moulding at a pressure of approximately 15 N/mm$^2$ to 20 N/mm$^2$;

drying said moulded green products; and firing said dried green products;

wherein the pozzuolanic components and lime are present in the ash fraction in a quantity sufficient to enable reaction products of the lime with the pozzuolanic components to develop during drying to maintain the stability of the molded green products, absent moisture, during firing.

2. The method of claim 1, wherein said moulding step employs a lime-sand type press.

3. The method of claim 1, wherein said filler material comprises ground waste glass.

4. The method of claim 3, wherein said ground waste glass comprises not more than approximately 10% by weight of said moulding compound.

5. The method of claim 1, wherein said mixing step further includes the step of adding at least one of highly alkaline mineral dusts and highly alkaline mineral sludges in an amount not more than approximately 10% by weight of said moulding compound.

6. The method of claim 1, wherein said filler material comprises quartz sand obtained from brown coal ash.

7. The method of claim 6, further comprising the steps of:

filtering brown coal fly ash using a filter having a first filter stage and at least one other filter stage; and using ash from said at least one other filter stage as said annealed clay minerals.

8. The method of claim 7, wherein said annealed clay minerals consist essentially of brown coal ash particles having diameters not greater than approximately 200 µm to 250 µm.

9. The method of claim 8, wherein said annealed clay minerals consist essentially brown coal ash particles having diameters not greater than approximately 40 µm to 70 µm.

10. The method of claim 1, wherein said annealed clay minerals consist essentially of brown coal ash particles having diameters not greater than approximately 200 µm to 250 µm.

11. The method of claim 10, wherein said annealed clay minerals consist essentially of brown coal ash particles having diameters not greater than approximately 40 µm to 70 µm.

12. The method of claim 1 further including about 1–2% of an inorganic adhesive.

13. The method of claim 12 wherein the inorganic adhesive comprises waterglass.

14. The method according to claim 1, wherein the enriched annealed clay minerals material is derived from brown coal ash.

* * * * *